Figure 1:
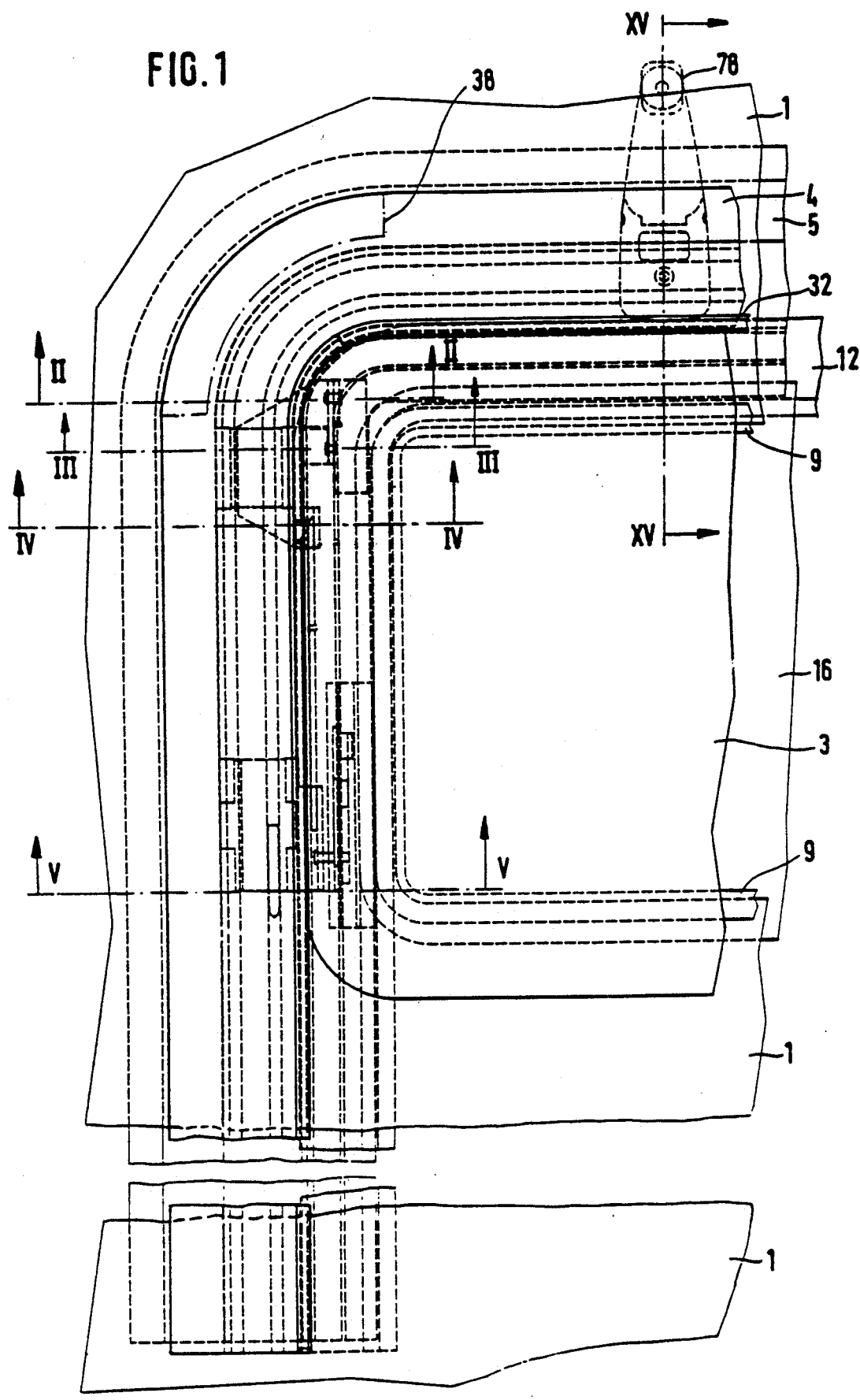

United States Patent [19]

Schlapp

[11] Patent Number: 5,326,149
[45] Date of Patent: Jul. 5, 1994

[54] BLOCKING DEVICE FOR SLIDING-LIFTING ROOFS FOR AUTOMOBILE

[75] Inventor: Albert Schlapp, Dreieich, Fed. Rep. of Germany

[73] Assignee: Rockwell Golde GmbH, Fed. Rep. of Germany

[21] Appl. No.: 4,335

[22] Filed: Jan. 14, 1993

[30] Foreign Application Priority Data

Jan. 14, 1992 [DE] Fed. Rep. of Germany ........ 4200724

[51] Int. Cl.⁵ .............................................. B60J 7/19
[52] U.S. Cl. ..................................... 296/224; 296/222; 296/223
[58] Field of Search ................ 296/216, 223, 224, 222

[56] References Cited

U.S. PATENT DOCUMENTS 4,650,243 3/1987 Hanley et al. ................... 296/224 X
4,887,285 10/1989 Huyer .............................. 296/224 X
4,974,902 12/1990 Huyer .............................. 296/224 X Primary Examiner—Dennis H. Pedder

[57] ABSTRACT

A sliding-lifting roof of an automobile including a blocking device which prevent sliding movement during tilting movements thereof. The blocking device is not effective during sliding movements. The sliding-lifting roof is guided along guide rails fixed laterally to the roof opening by oppositely located forward and rear guide shoes. The roof is connected to the rear shoes by pivoting-out elements and is connected to the forward shoes in a manner allowing pivoting about a horizontal axis traverse to the direction of sliding. The blocking device includes a control rod attached to the rear guide shoe and slidably guided on the forward guide shoe. A detent element fitted to the forward guide shoe and actuated by the control rod may be engaged with a recess formed in the guide rail to prevent sliding during tilting movements.

6 Claims, 7 Drawing Sheets

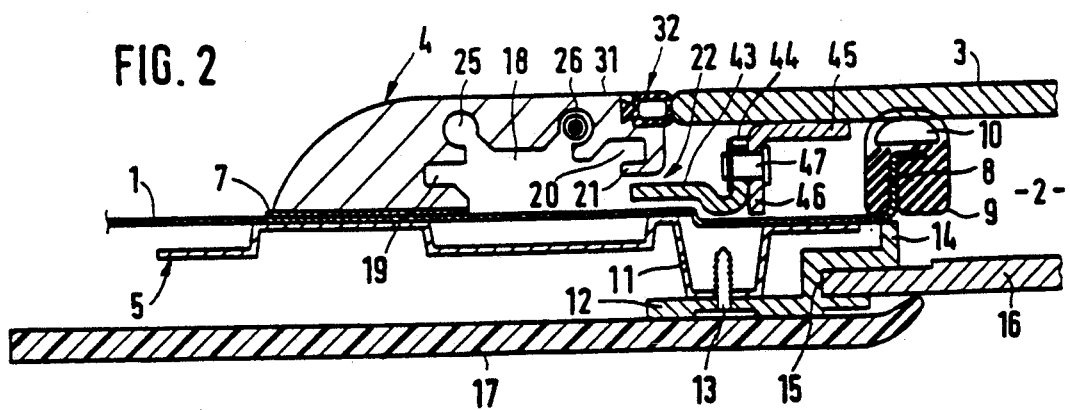
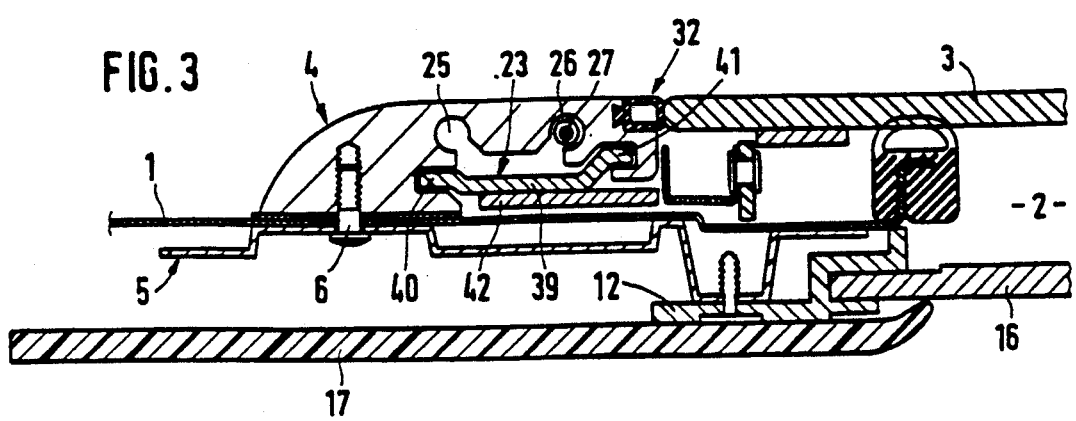
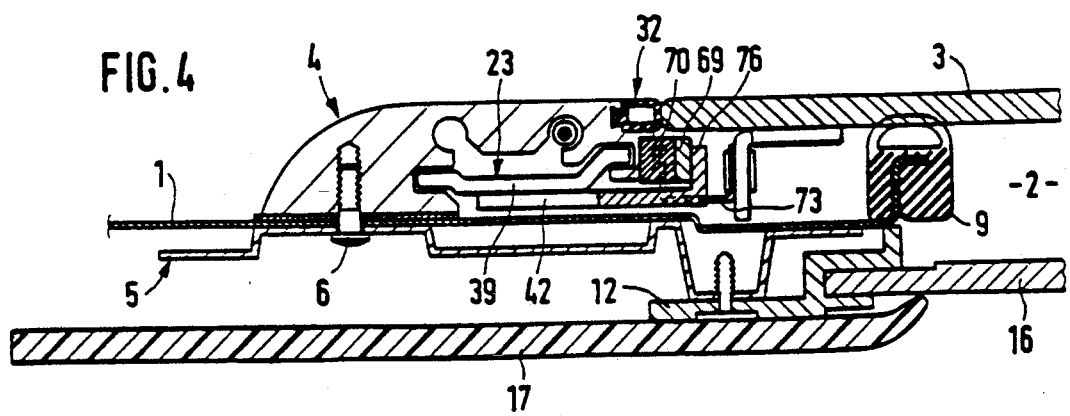
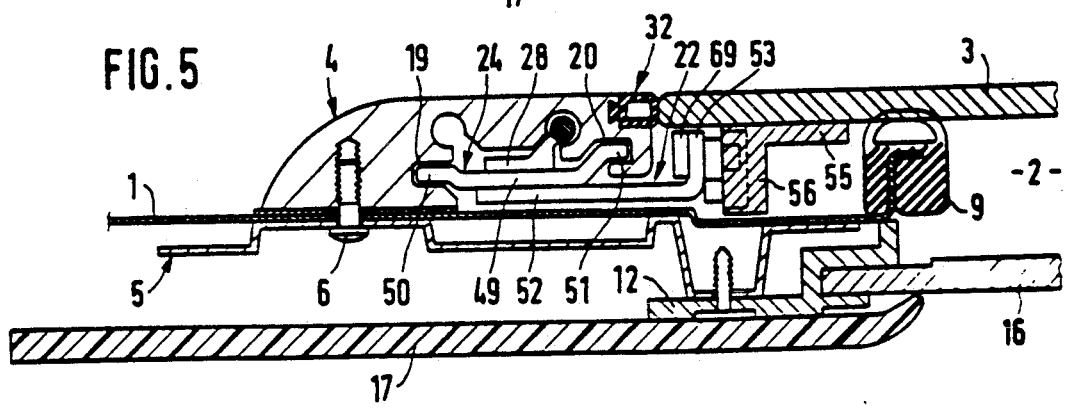

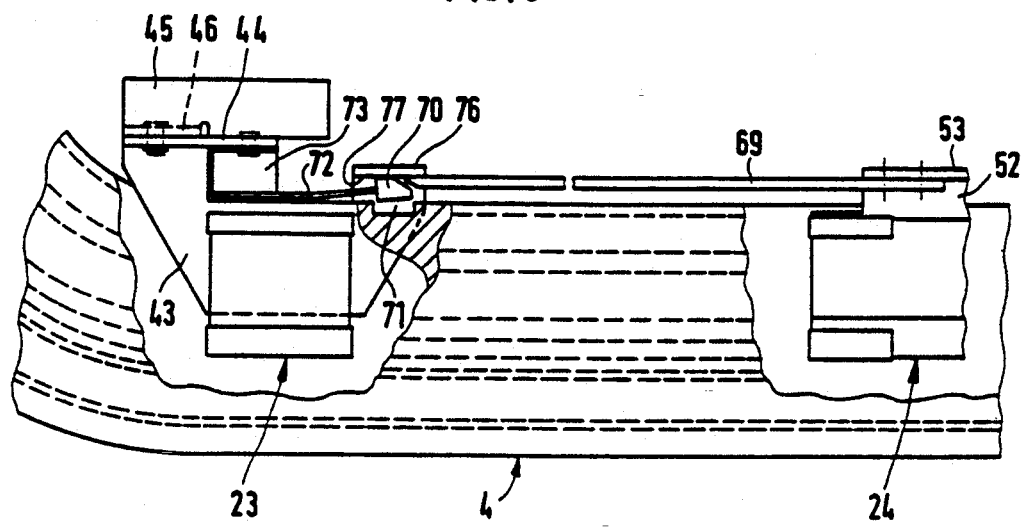
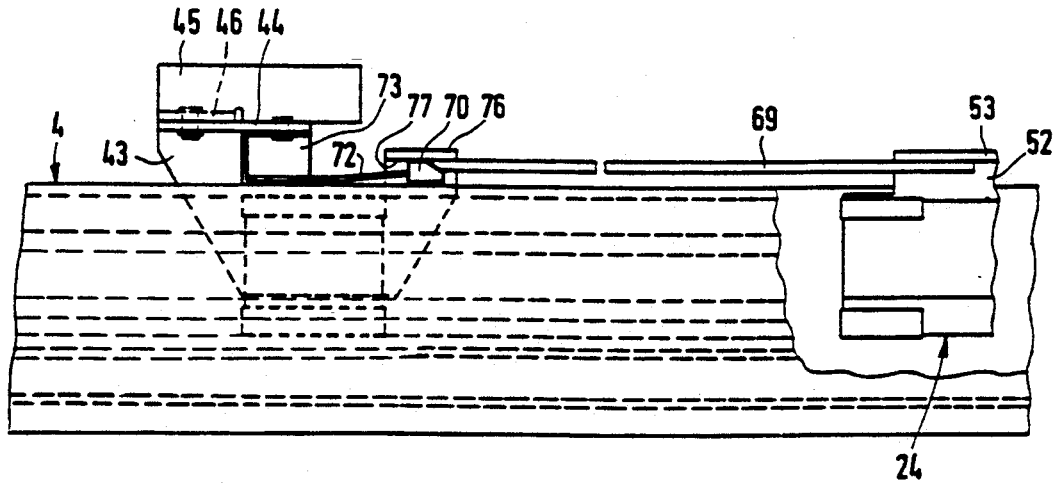

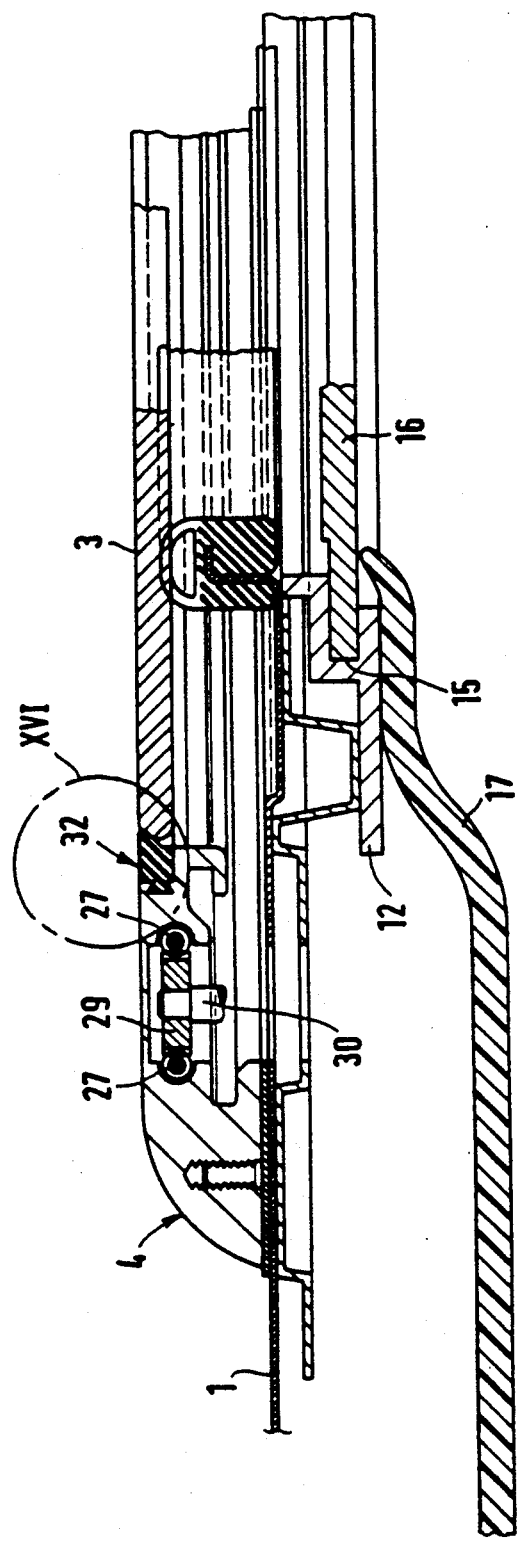
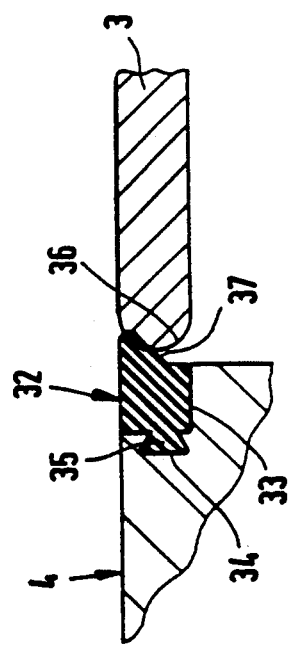

BLOCKING DEVICE FOR SLIDING-LIFTING ROOFS FOR AUTOMOBILE

This invention relates to a blocking device for sliding-lifting roofs for automobiles. The term "sliding-lifting roofs" is to be understood also to include top sliding-lifting roofs, in which the sliding-lifting roof unit is mounted on and fixed to the fixed roof surface of an automobile.

Blocking devices of this type for sliding-lifting roofs are already known in various forms of construction (e.g. DE 33 00 308 C2). They have the purpose of preventing incorrect functioning during driving of the sliding lid, on the one hand by blocking the sliding lid against sliding movements when the sliding lid is tilted outwards or is performing inward pivoting movements, and on the other hand of releasing the sliding lid for sliding movements when it is lowered (sliding-lifting roof) slightly at its rear edge out of its closed position into its displacement position, or is raised (top sliding-lifting roof) for the same purpose. It is typical of blocking devices of this type that they consist of stationary elements and of slidably movable elements cooperating in controlled manner therewith. The known devices in general require accurate setting and adjustment for proper functioning, and are frequently composed of many parts and are therefore costly, especially when they comprise articulated components, such as two-armed levers.

The objective of the present invention is to provide a blocking device which shall be of especially simple construction while also reliable in operation.

According to the basic concept of this invention, the relative displacements that take place between the rear and the front guide shoes, in the outward tilting and inward pivoting movements, are utilized for controlling the blocking and detent elements which according to this invention are allocated to the front and rear guide shoes. In this way, an especially simple and reliable construction of the device is achieved. The control rod fixed to the rear guide shoe acts upon the detent element pivotally mounted on the forward guide shoe and determines whether the detent element is held in the associated, stationary detent recess to prevent displacements of the lid or can move out of this recess to make lid sliding movements possible.

The arrangement ensures, in a simple manner, that the detent element, after it has been released by the control rod, moves out of the detent recess driven by spring force. Within the framework of the invention, however, a positive control of the detent element by the control rod is also possible in the sense that the control rod actively lifts the detent element out of the detent recess.

An especially simple form of construction is obtained if, the spring force acting upon the detent element is applied by a leaf spring, which also provides the pivotal connection of the detent element to the forward guide shoe.

The advantageous form of construction ensures that the blocking elements which are disengaged during the opening sliding and, of course, also in all intermediate slid positions, can act upon one another in the blocking position without application of large force, the detent element being reliably displaced, exclusively towards the detent recess.

The advantageous arrangement of the guide surface on the forward guide shoe ensures, in all relative positions between the forward and the rear guide shoes, a supported sliding guide bearing of the control rod, without the control rod being able to overtake or slide over the detent element when the latter is not opposite the associated detent recess.

For proper control functioning of the blocking device, it is only basically the stated relative length of the control rod that is of importance, without complex adjustments needing to be performed.

Figure 11:
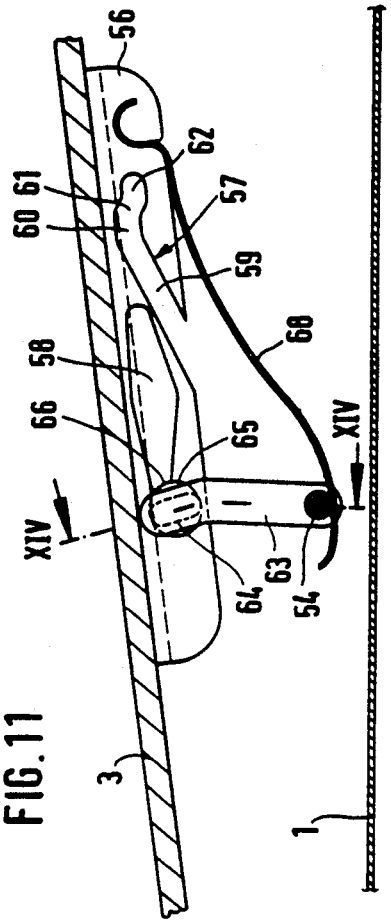
Figure 14:
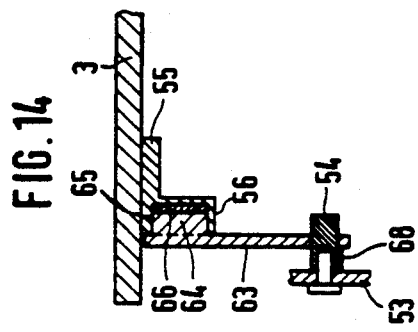
Figure 10:
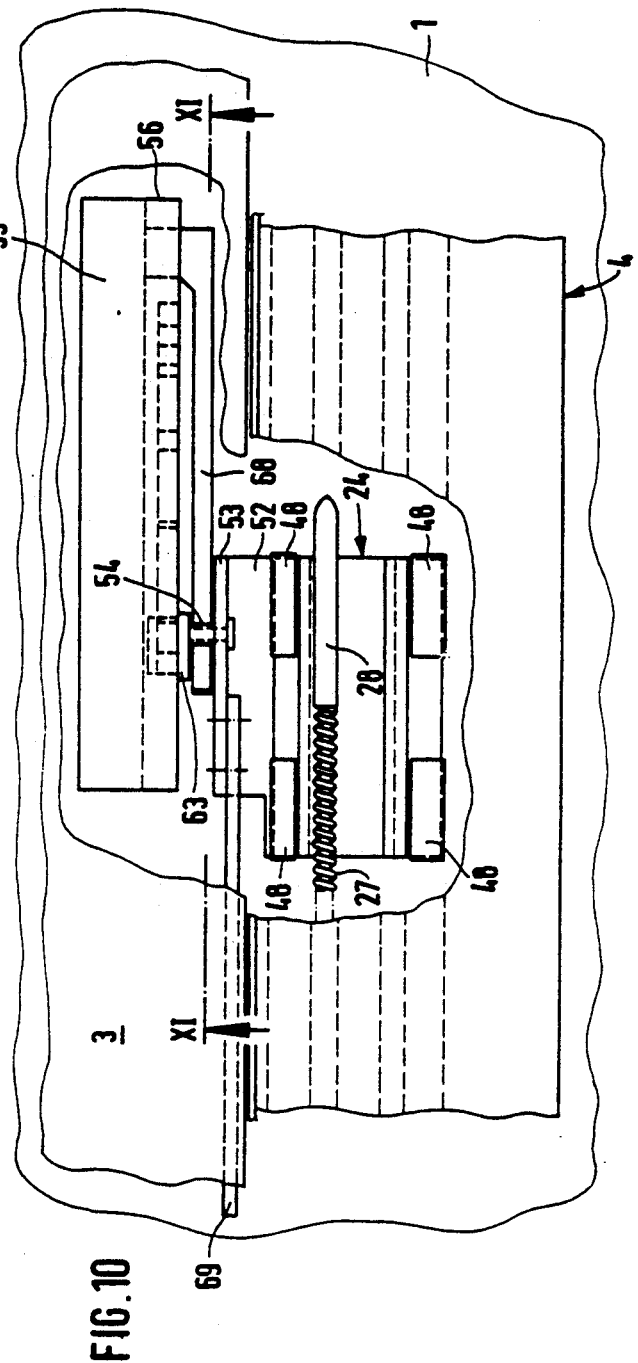
Figure 12:
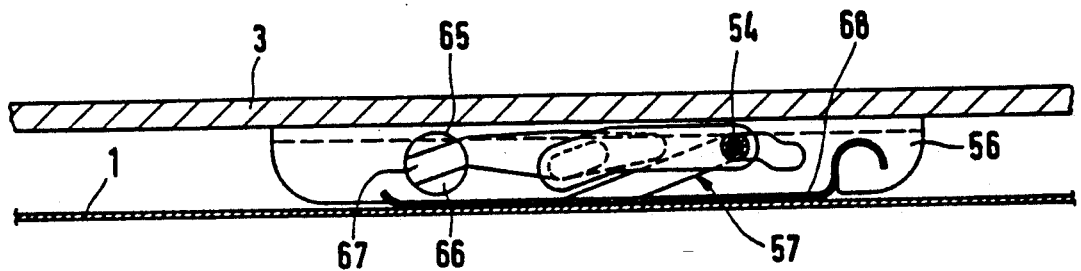
Figure 13A:
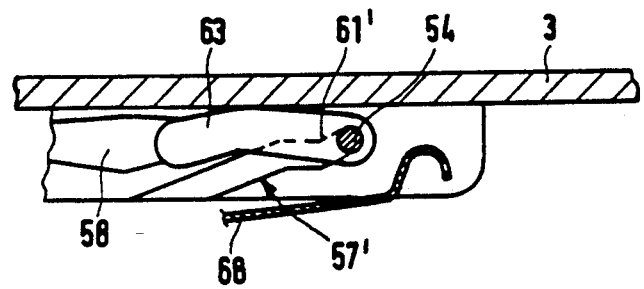
Figure 13:
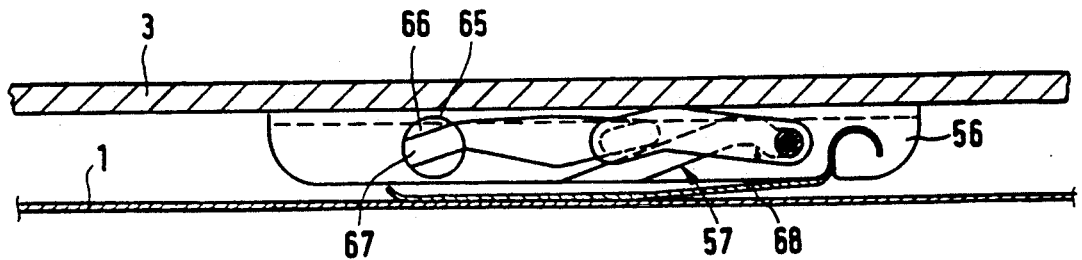

An example of embodiment, which relates to the application of this invention in a top sliding-lifting roof is explained below in more detail with reference to the drawings. The figures in the drawings show:

FIG. 1 a partial plan on an automobile roof with top sliding-lifting roof mounted thereon, with the sliding lid in the closed position, FIGS. 2 to 5, sectional views on the lines II—II to V—V in FIG. 1, FIGS. 6 to 9, in partial, cut-away, different plan views, blocking elements for preventing undesired sliding movements of the sliding lid, illustrated for various positions of the lid, FIG. 10 a partial, cut-away plan on a rear guide shoe and associated guide block, FIG. 11 a partial sectional elevation along the line XI—XI of FIG. 10 with the sliding lid pivoted out, FIG. 12 a sectional view similar to FIG. 11 with sliding lid closed, FIG. 13 a sectional view similar to FIGS. 11 and 12 with the sliding lid raised for the opening displacement, FIG. 13a a sectional view similar to FIG. 13 with the sliding lid of a sliding-lifting roof (not fitted above the fixed roof), lowered for the opening displacement, FIG. 14 a partial sectional elevation along the line XIV—XIV in FIG. 11, FIG. 15 a partial sectional elevation along the line XV—XV in FIG. 1, and FIG. 16 a sectional detail to larger scale corresponding to the sectioned circle XVI in FIG. 15.

On the fixed roof surface 1 of an automobile body, a sliding-lifting roof unit is mounted. In the roof surface ]there is a roof opening 2, which can be closed by a sliding lid 3, which is constructed as a glass lid but can also be made of metal or plastics. The sliding lid 3, in its closed position shown in FIG. 1, overlaps the roof opening 2 on all sides and is slidable over the rear, fixed roof surface 1 to expose the roof opening 2. The sliding lid 3 is surrounded at the front and sides by an outer frame 4, on which the sliding lid 3 is guided in a manner to be explained and which serves as mounting frame for the preassembled sliding-lifting roof unit. The outer frame 4 is open to the rear (FIG. 1) and extends with its lateral arms over the entire opening displacement distance of the sliding lid 3. Beneath the fixed roof surface 1 a counter-frame 5 is mounted opposite the outer frame 4, this counter-frame being firmly connected to the outer frame 4 by screws 6 with insertion of a sealing strip 7 between the outer frame 4 and the roof surface 1. The counter-frame 5 surrounds the roof opening 2 also on three sides and is also orientated towards the rear with its free ends, the length of the lateral arms being adapted to the length of the lateral arms of the outer frame 4.

The fixed roof surface 1 is provided, at the roof opening 2, with a peripheral, uniform upward flange 8, onto which a sealing profile 9, also extending all around and having the same section throughout its length, is pushed, which sealing profile bears against the closed sliding lid 3 from below to create a peripheral seal for the roof opening 2. The sealing profile is provided, in its upper region facing towards the sliding lid 3, with a hollow chamber 10 which increases its flexibility.

The counter-frame 5, in the example shown, is profiled from metal sheet and has a constant profile over its entire length. In the vicinity of its inner edge there is a downwardly projecting corrugation 11, to which a guide frame 12, also surrounding the roof opening 2 on three sides and with its ends oriented backwards, is attached by clips 13 or the like, which guide frame is provided on its inner side with a projecting strip 14, intended for bearing upwardly against the fixed roof surface 1, this strip lying approximately flush with the upward flange 8 of the roof surface 1. Furthermore, the guide frame 12 is provided, over its entire length, with an inwardly orientated guide groove 15, in which the lateral edges of a slidable solar protective panel 16 are guided. If the solar protective panel 16 is pushed fully forwards to cover the roof opening 2 entirely, as indicated in FIG. 15, then its forward edge is pushed into the forward transverse part of the guide groove 15. When the sliding lid 3 is made of metal, a solar protective panel 16 can be dispensed with. The inner face of the roof surface 1, including the counter-frame 5 and the guide frame 12, is covered by a lining shell 17, lining the upper internal space of the vehicle, which has an opening approximately corresponding to the roof opening 2.

The outer frame 4 is constructed in one piece with integrated guide rails and comprises a downwardly, inwardly open profiled channel 18, from which depart two adjacently situated guide grooves 19 and 20, forming the guide rails. The guide grooves 19 and 20 are slightly offset in height, so that beneath a profiled flange 21, forming the lower boundary of the guide groove 20, a lateral passage gap 22 is formed between the roof surface 1 and the profiled flange 21 to permit passage of guide components, yet to be described, for the sliding lid 3. In the guide grooves 19 and 20, a front guide shoe 23 and a rear guide shoe 24 are slidably guided on each of the two sides of the sliding lid 3.

In the outer frame 4, above the guide grooves 19 and 20 for the guide shoes 23 and 24, there are also situated alongside each other two guide channels 25 and 26 for flexible drive cables 27, guided slidably therein in pressure-stiff manner. On each side of the lid one of the drive cables 27 is connected by an entraining dog 28 force-transmittingly to a rear guide shoe 24. The guide channels 25 and 26 open in slits towards the profiled channel 18, so that the entraining dogs 28 can penetrate through the slit-shaped openings to the relevant drive cables 27. In the forward transverse portion of the outer frame 4, a drive pinion 29 is rotatably journalled in the region between the two drive cables 27. The drive cables 27 are provided, in the manner usual for cable drives of this type, with a helical wire peripheral winding, which engages in the manner of a toothed rack into the teeth of the drive pinion 29, so that rotations of the drive pinion 29 cause displacements of the drive cables 27, of the rear guide shoes 24 connected therewith and of the functional components connected thereto and still to be explained. As is furthermore evident from FIG. 15, a drive shaft 30 is torsionally locked to the drive pinion 29, and leads to a hand-operated or motor-driven drive apparatus.

The outer frame 4 is rounded or chamfered at its outer periphery towards the fixed roof surface 1, to form a streamlined transition to this roof surface 1.

The outer frame 4 is flush, at its upper surface 31, with the upper face of the sliding lid 3, with the interposition of an edge gap seal 32. In this way the top sliding roof has a completely smooth outer shape. The edge gap seal surrounds the lid in its closed position at its front and its two lateral edges and furthermore extends over the entire length of the lateral arms of the outer frame 4. For fitting the edge gap seal 32, a seating groove 33 is provided at the upper, inner edge of the outer frame 4. In the vertical face, forming the seating groove 33, a back-cut fixing groove 34 for receiving a dovetail fixing projection 35 of the edge gap seal 32 is provided. In the region of the lateral arms of the outer frame 4, the edge gap seal 32 is constructed as a hollow chamber profile, as can be seen from FIGS. 2 to 5. In the region of the forward transverse portion of the outer frame 4, the edge gap seal 32, in contrast, is formed without a hollow chamber as a solid profile, so that in this region the elastic deformability of the edge gap seal 32 is reduced. Moreover, on this forward region of the edge gap seal 32, an inclined surface 37, associated with the rounded forward edge 36 of the sliding lid 3, is provided on the solid material profile. When the sliding lid 3 in its closure displacement meets this inclined surface 37, it is thereby displaced slightly downwards and thus pressed against the sealing profile 9. If the sliding lid 3 is tilted upwards at its rear edge, the forward edge 36 is guided downwards along the inclined surface 37, with the result that the formation of a gap between the outer frame 4 and the front edge 36 of the lid is prevented.

The single-piece, U-shaped outer frame 4 may be provided, to facilitate bending at its two front corners, with cut-outs 38, of which the left, forward cut-out is shown in FIG. 1 in dot-and-dash line. The cut-outs 38 are closed by shaped inserts fitted after bending.

For a more detailed explanation of the guiding and functional components for the sliding lid 3, reference is made in correspondence with the attached drawings exclusively to the left side of the sliding-lifting roof as seen in the direction of travel, because the right side is constructed as a mirror-image thereto.

The forward guide shoe 23 has a guide plate 39 with upwardly and outwardly bent guide projections 40 and 41, which engage slidably into the associated guide grooves 19, 20 respectively. The guide projections 40 and 41 may, in order to reduce friction, be provided with sliding shoes of plastics (not shown). The guide plate 39 is firmly connected to a lower base plate 42, which penetrates at its front end without contact through the gap 22 with a pivot bearing projection 43 and terminates underneath the sliding lid 3 with a vertical bearing flange 44. In this region, in the vicinity of the front edge of the lid and at a distance from its longitudinal edge, a front lid beam 45 is firmly connected to the lower side of the sliding lid 3, for example by gluing. The lid beam is of angle-section and is pivotally connected, with its downwardly pointing flange 46, to the bearing flange 44 by means of a pivot bearing pin 47, as can be seen from FIG. 2. The pivot bearing pins 47 on the left and right sides of the sliding lid 3 form a pivot bearing axis for the sliding lid 3, extending transversely to the direction of sliding.

As can be seen from. FIG. 5 in comparison with FIGS. 3 and 4, the rear guide shoe 24 is constructed corresponding to the forward guide shoe 23 and also has a guide plate 49, which is bent upwardly and outwardly to form guide projections 50 and 51, which are slidably guided in the associated guide grooves 19, 20 respectively. Here again, the guide projections 50 and 51 may be provided with sliding shoes 48 (FIG. 10) of plastics, to reduce friction. The already mentioned entraining dog 28 is firmly connected to the guide plate 49. Here also, the guide plate 49 is firmly connected to a base plate 52, situated beneath it. The base plate 52 penetrates through the gap 22 without contact and terminates underneath the sliding lid 3 with a vertically upwardly bent fixing strip 53. A guide pin 54 is secured to this fixing strip 53.

In the vicinity of the rear edge of the lid and at a distance from its longitudinal edge, there is a rear lid beam 55, which once again is of angle section and is fixed to the lower side of the lid, for example by gluing. Its downwardly orientated flange is constructed as a guide block 56, which engages in a manner yet to be described with the guide pin 54. For a further explanation of the guide block and the components connected to it, reference is now made to FIGS. 10 to 14.

As can be most clearly seen from FIG. 11, in the guide block 56, adjacent to one another and partly overlapping, a guide slit 57 for engagement with the guide pin 54 is provided at the rear and an elongate, specially shaped aperture 58 is provided at the front. The guide slit 57 comprises basically four portions, namely a longer, first rectilinear portion 59, rising from front to rear relative to the sliding lid 3, a rearwardly directed short second portion 60, adjoining thereto and approximately parallel to the sliding lid 3, a short, obliquely downwardly directed third portion 61, adjoining thereto, and a short, rearwardly directed fourth portion 62, adjoining thereto and parallel to the sliding lid. The first portion 59 is associated with the outward pivoting movement of the sliding lid, the second portion 60 corresponds to the closed position of the sliding lid 3, the third portion 61 is associated with a vertical upward displacement of the rear edge of the lid, and the fourth portion 62, finally, receives the guide pin 54 in the opening sliding movement of the sliding lid 3, raised somewhat at its rear edge. In FIG. 12, the guide pin 54 is situated in the second portion 60, i.e. the sliding lid 3 is in its closed position. In FIG. 13, the guide pin 54 is in the fourth portion 62, i.e. this figure shows a position of the components which they adopt during the opening displacement of the sliding lid from the start to the end of the opening displacement. The first portion 59 of the guide slit 57 is open towards the front for the escape and entry of the guide pin 54 out of and into respectively the guide block 56. In the position of the sliding lid 3 according to FIG. 11, the guide pin 54 is situated outside the guide block 56. As will be explained later, the engagement of the guide pin 54 into the guide slit 57 of the guide block 56 causes a first phase of the outward pivoting movement and second phase respectively of the opposite movement, i.e. the inward pivoting movement.

Furthermore, between the rear guide shoe 24 and the guide block 56, a control lever 63 is provided, which on the one hand is articulated to the rear guide shoe 24 and on the other hand is connected rotatably and slidably to the guide block 56. This control lever 63 is associated, in a manner to be described later, with a second phase of the outward pivoting movement and first phase of the oppositely directed inward pivoting movement respectively, and during the phases of the effectiveness of the control lever 63 the engagement between the guide block 56 and the guide pin 54 is cancelled out.

In the example of embodiment shown, the control lever 63, for the purpose of its articulation to the rear guide shoe 24, is pivotally connected to the guide pin 54, as FIGS. 11 and 14 show. In this manner the control lever 63 is pivotally journalled in a plane perpendicular to the sliding lid 3. At the other end of the control lever 63, this lever is provided with a guide projection 64, engaging into the guide block 56. The guide projection 64 is flattened on two parallel, opposite faces and has an elongate form, rounded at its two ends. When the sliding lid 3 is closed, during the opening displacement, during the closure displacement and during the phases of the outward pivoting and inward pivoting movements controlled by the engagement between the guide slit 57 and the guide pin 54, the guide projection 64 is situated in the aperture 58, the shape of which is determined by the dimensions of the guide projection 64 and the superimposed rotational and displacement movements of the guide projection 64 in the aperture 58. During these movements of the guide pin 64 inside the aperture 58, the control lever 63 is in its functionless movement phases.

The aperture 58 opens out, at its front end, into a cylindrical bearing opening 65, in which a fitting bearing disc 66, cylindrical at its outer periphery, is permanently disposed and rotatably journalled. The fitting of the bearing disc 66 into the bearing opening 65 is, however, such that the bearing disc cannot unintentionally rotate in its bearing opening 65, that is to say without engagement with the guide projection 64. In the bearing disc 66, there is a diametrally orientated slit 67, continuous at both ends as far as the periphery of the bearing disc 6, for the fitting, non-rotatable seating of the guide projection 64 during the second phase of the outward pivoting movement and first phase of the oppositely directed inward pivoting movement, respectively, of the sliding lid 3.

A leaf spring 68 is rigidly fixed to the rear end of the guide block 56. Its free, forwardly projecting arm extends parallel to and underneath the guide block 56 and is prestressed as a whole towards the guide block 56. The leaf spring 68 therefore bears against the guide pin 54 with spring force as soon as the latter emerges at the end of the first phase of the outward pivoting movement from the guide slit 57. In this way the leaf spring 68 counteracts the rattling noises caused by the play in the system.

For a more detailed explanation of a blocking device for undesired sliding movements of the lid 3 reference is made below to FIGS. 6 to 10. The blocking elements illustrated here may be provided in a mirror-image arrangement on both sides of the roof opening. They comprise a control rod 69, fixed to the rear guide shoe 24 and slidably guided on the adjacent, forward guide shoe 23, and also a detent element 70, movably mounted on the forward guide shoe 23 and actuated in a manner yet to be described by the control rod 69, which detent element is associated with a detent recess 71 on the guide rail for the guide shoes 23 and 24. In the example shown, the detent recess 71 is in the surface of the outer frame 4 which is towards the sliding lid 3.

The control rod 69 is rigidly fixed to the fixing strip 53 of the base plate 52 of the rear guide shoe 24. The detent element 70 is pivotally fixed to the forward guide shoe 23, in the example shown by means of a leaf spring 72, by which the detent element 70 is permanently biased to escape from the detent recess 71. The leaf spring 72 is a component of a spring holder 73, fixed to the bearing flange 44 of the pivot bearing projection 43. The detent element 70 has, at its end towards the rear guide shoe 24, a run-on slope 74 for the free end of the control rod 69, which is so orientated that the end of the control rod 69 associated with it loads the detent element 70 in the direction of displacement towards the outer frame 4. The end of the control rod 69 is also provided with an inclined surface 75, which is associated with the run-on slope 74 on the detent element 70 and is aligned parallel thereto.

Figure 6:
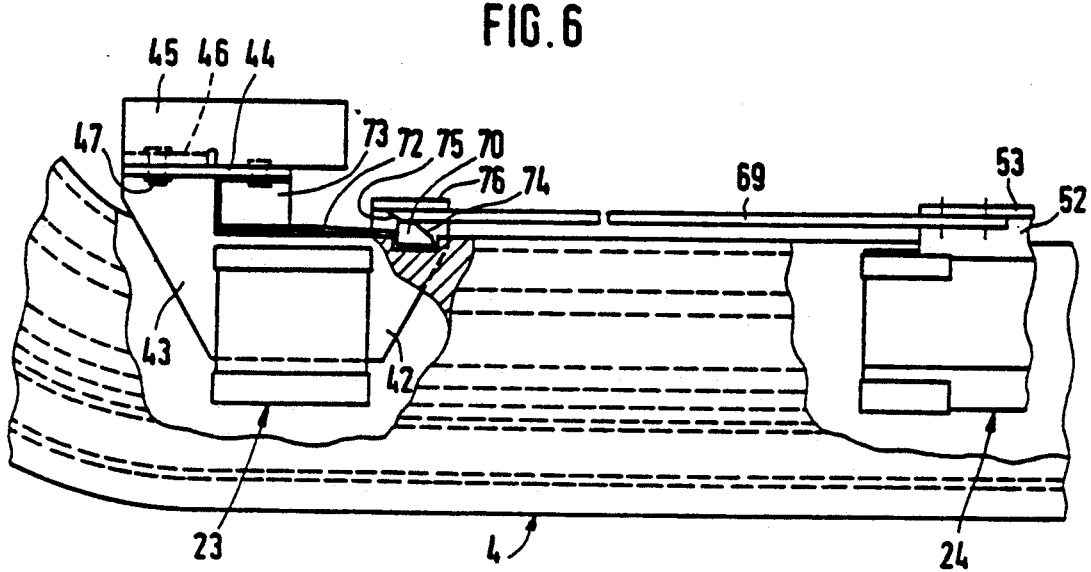
Figure 7:
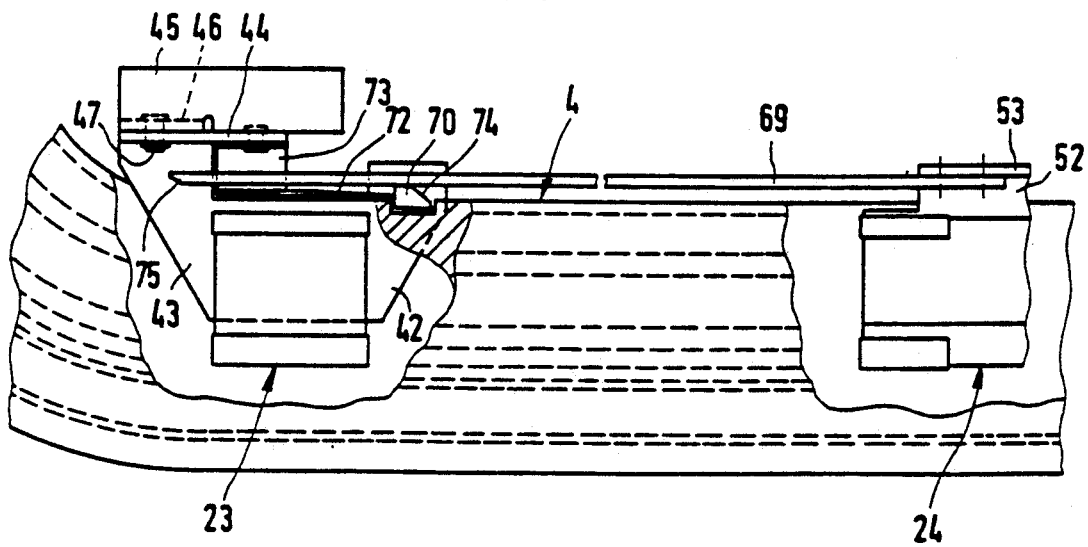

At the rear end of the base plate 42 of the forward guide shoe 23 there is a right-angled, upwardly cranked flange 76, which on its inside forms a guide surface 77 for the control rod 69, bearing against it in every position of the sliding lid. The distance from the guide surface 77 to the adjacent, parallel surface of the outer frame 4 is so selected that this distance approximately equals the transverse dimension of the detent element 70, as can be best seen from FIG. 9. The dimensional sum of the aforementioned distance and the depth of the detent recess 71 is approximately equal to the transverse dimension of the detent element 70 plus the thickness of the control rod 69, as FIGS. 6 and 7 show. When the sliding lid is closed (FIG. 6) the detent element 70 is in the detent recess 71 and is held therein by the control rod 69, bearing against the guide surface 77. In the pivoted-out positions also of the sliding lid, the detent element 70 is held by the control rod 69 in the detent recess 71, as seen in FIG. 7. After raising of the rear edge of the sliding lid 3 (top sliding-lifting roof), or after lowering of the rear edge of the sliding lid 3 (sliding-lifting roof), the control rod 69 has released the detent element 70, so that the latter can emerge from the detent recess 71, as FIG. 8 shows. After cancellation of the engagement, the sliding lid can be displaced rearwards, starting from the position shown in FIG. 8. During displacement of the sliding lid 3 towards its closed position, the inclined surface 75 of the control rod 69 bears against the run-on slope 74 of the detent element 70, but the detent element 70 cannot displace, because it is sliding along the facing surface of the outer frame 4. The control rod 69 cannot, however, overtake the detent element 70 because of its bearing against the guide surface 77. The rear guide shoe 24, driven by the drive cable 27 towards the closure direction, therefore displaces by means of the control rod 69 the forward guide shoe 23 and thus the sliding lid 3. The closure displacement is continued in this way until the detent element 70 has arrived at the detent recess 71 and is now pushed by the control rod 69 into this recess.

It will be seen that the length of the control rod 69 should be so dimensioned, in accordance with the distance between the detent element 70 of the forward guide shoe 23 and the rear guide shoe 24 that the control rod 69 completely releases the detent element 70 for the opening displacement of the sliding lid 3 (FIG. 8) but bears force-transmittingly with its end against the detent element 70 during the closure displacement (FIG. 9).

The method of functioning of the above-described sliding-lifting roof construction is now explained below. In the closed position of the sliding lid 3 (FIGS. 6, 12) the detent element 70 is situated in the detent recess 71, and the guide pin 54 is situated in the second portion 60 of the guide slit 57. If, starting from this closed position, an opening displacement of the sliding lid 3 is to take place, then by appropriate rotational actuation of the drive pinion 29 (FIG. 15), for example by the hand crank 78 shown in FIG. 1, the drive cables 27 are so displaced in their guide channels 25 and 26 that, for the side of the lid considered here (FIG. 10), the rear guide shoe 24 is displaced rearwards (to the right). The control rod 69 here prevents escape of the detent element 70 out of the detent recess 71 until the guide pin 54 has raised the rear edge of the sliding lid 3, by sliding in the third portion 61 of the guide slit 57, for at least partially lifting the sliding lid 3 off the sealing profile 9. With the sliding block arrangement according to FIG. 13a, this movement sequence corresponds, in the case of a sliding-lifting roof which is not rested upon the fixed roof surface, to the movement of the guide pin 54 in the portion 61' of the guide slit 57'. The sliding lid 3 is here lowered at its rear edge, in order thereafter to be able to be slid beneath the fixed roof surface.

If the displacement drive of the rear guide shoe 24 is continued in the stated direction, the guide pin 54 arrives in the fourth portion 62 of the guide slit 57, and the control rod 69 releases the detent element 70, so that the latter can emerge from the detent opening 71. The sliding lid is now released for a further opening displacement movement. In the case of a closure displacement, the operations described take place in the reverse sequence.

If now the sliding lid 3, starting from its closed position (FIGS. 6, 12) is to be pivoted upwards by its rear edge into a ventilating position, then the drive cables 27 are driven in the manner described but in the opposite direction, so that for the side of the lid considered (FIG. 10) the rear guide shoe 24 is displaced forwards (to the left). The control rod 69 now holds the detent element 70 in the detent recess 71, with the result that the front guide shoe 23 and the sliding lid 3 connected to it are prevented from displacing. The guide pin 54 comes out of the second portion 60 into the first portion 59 of the guide slit 57. Since the guide pin 54 can move only along a rectilinear path running parallel to the guide rail formed by the guide grooves 19 and 20, but the first portion 59 of the guide slit 57 runs obliquely, the sliding lid 3 is raised at the rear by the guide pins 54. This first phase of the outward pivoting movement lasts until the guide pin 54 has arrived at the end of the first portion 59 and emerges from it. Up to this instant, the control lever 63 has been inactive and was only entrained forwards by the guide pin 54 with increasing pivoting clockwise, its guide projection 64 being displaced inside the aperture 58. At the end of this displacement movement, the guide projection 64 has entered the slit 67 of the bearing disc 66. When the guide pin 54 escapes from the first portion 59, the guide projection 64 is situated completely in the slit 67, so that the guide projection 64, together with the bearing disc 66 entrained in rotation by it, can now rotate in the bearing opening 65 for the second phase of the outward pivoting movement. A further movement of the guide pin 54 in the stated direction now leads to a further pivoting of the control lever 63, raising the sliding lid 3, until the maximum position illustrated generally in FIG. 11 is reached. In the pivoting-in of the sliding lid, the described movement sequence takes place in reverse, and here again the detent element 70 is held by the control rod 69 in the detent recess 71 to secure the sliding lid against sliding. During the pivoting of the sliding lid 3, this lid pivots about the axis formed by the pivot bearing pins 47.

The described solar protective panel 16 is independent of the sliding movements of the sliding lid 3 and can be displaced independently in any position of the sliding lid 3.

As FIGS. 11 to 13 in particular illustrate, by the arrangement of the control lever 63 with its pivot bearing in the guide block 56, the result is advantageously achieved that a long displacement travel of the rear guide shoe 24 in the forward direction for completely pivoting out the rear edge of the lid and an associated long inclined first portion of a guide slit, are partly replaced by a lever extension. In this way the guide slit 57, which produces the first phase of the outward pivoting movement, can be made considerably shorter. In the result, by this arrangement the supporting of the pivoted-out sliding lid is improved, because the rear support moves nearer towards the rear edge of the lid, with the result that the support base, even for the fully pivoted out sliding lid, is comparatively large.

In the described top sliding-lifting roof construction, all the functional components of the roof construction which connect the guide shoes 23, 24 to the sliding lid 3, on each side of the roof opening 2, when the sliding lid is closed are situated protected inside a space which is bounded by the outer frame 4, the inner surface of the sliding lid 3, the upward flange 8 with sealing profile 9 and the upper face of the fixed roof surface 1.

The outward pivoting or lifting function of the described top sliding-lifting roof construction is guaranteed by the fact that all the functional components that participate in the lid pivoting movements, i.e. the guide blocks 56, control levers 63, leaf springs 68 and lid beams 45, 55, do not project beyond the lateral edges of the sliding lid 3, but are arranged set back behind it.

What is claimed is:

1. A blocking device for sliding-lifting roofs for roof openings of automobiles, the roof comprising a rigid sliding lid which is guided with forward and rear guide shoes on guide rails fixed laterally to the roof opening, the roof is connected in the rear region to pivoting-out elements and is pivotally journalled by pivot bearings mounted on the forward guide shoes about a horizontal axis extending transversely to the direction of sliding, blocking elements, disposed on at least one side of the sliding lid (3), comprising a control rod (69) fixed to the rear guide shoe (24) and slidably guided on the adjacent forward guide shoe (23), a detent element (70) actuated by the control rod (69), and a detent recess (71) on a guide rail outer frame (4) receiving the detent element (70) in a tilted position of the roof, the detent element (70) is attached to the forward guide shoe (23) and is continually biased by a spring (72) in the direction of moving out of the detent recess (71).

2. Blocking device according to claim 1, characterized in that the spring is constructed as a leaf spring (72), by which the detent element (70) is fixed to the forward guide shoe (23).

3. Blocking device according to claim 2, characterized in that the detent element (70) possesses, at its end towards the rear guide shoe (24), a run-on slope (74) for the free end of the control rod (69), which is so oriented that the end of the control rod (69) bearing against it loads the detent element (70) in the direction of displacement towards the guide rail outer frame (4).

4. Blocking device according to claim 3, characterized in that the end of the control rod (69) also is provided with an inclined surface (75), which bears against the run-on slope (74) on the detent element (70) and is orientated parallel thereto.

5. Blocking device according to claim 4, characterized in that, on the forward guide shoe (23), a guide surface (77) for the control rod (69) is provided, against which the control rod (69) bears continuously and the distance of which from the adjacent, parallel surface of the guide rail outer frame (4) is approximately equal to a transverse dimension of the detent element (70), the dimensional sum of the distance and of the depth of the detent recess (71) being approximatley equal to the transverse dimension of the detent element (70) plus the thickness of the control rod (69).

6. Blocking device according to claim 5, characterized in that the length of the control rod (69) is so dimensioned, in accordance with the distance between the detent element (70) of the forward guide shoe (23) and the rear guide shoe (24), that the control rod (69) completely releases the detent element (70) for the opening displacement of the sliding lid (3), but bears force-transmittingly with its end against the detent element (70) during the closure displacement.

* * * * *